United States Patent [19]
Paine et al.

[11] Patent Number: 5,952,402
[45] Date of Patent: Sep. 14, 1999

[54] PHASE CHANGE INK COMPOSITIONS

[75] Inventors: Anthony J. Paine; Gordon K. Hamer, both of Mississauga; Carl P. Tripp, Burlington, all of Canada; James P. Bareman, Bellingham, Wash.; Fatima M. Mayer, Mississauga; Guerino G. Sacripante, Oakville, both of Canada

[73] Assignee: Xerox Corporation, Stamford, Conn.

[21] Appl. No.: 09/138,119

[22] Filed: Aug. 21, 1998

Related U.S. Application Data

[63] Continuation of application No. 08/831,451, Mar. 31, 1997, Pat. No. 5,844,020.

[51] Int. Cl.⁶ ..................................................... C09D 11/10
[52] U.S. Cl. .................................................................. 523/161
[58] Field of Search ............................................. 523/161

[56] References Cited

U.S. PATENT DOCUMENTS 4,656,235  4/1987  Tesoro ........................................ 528/26

*Primary Examiner*—Paul R. Michl
*Attorney, Agent, or Firm*—E. O. Palazzo

[57] ABSTRACT

An ink composition comprised of a colorant and a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C.

19 Claims, No Drawings

PHASE CHANGE INK COMPOSITIONS

PENDING APPLICATIONS AND PATENTS

This application is a continuation of Ser. No. 08/831,451 filed on Mar. 31, 1997 now U.S. Pat. No. 5,844,020.

Illustrated in U.S. Pat. Nos. 5,688,312; 5,667,568; 5,700,316 and 5,747,554; and copending U.S. application Ser. No. 641,886, are ink compositions, and processes thereof. The disclosures of each of these applications are totally incorporated herein by reference.

BACKGROUND OF THE INVENTION

The present invention is directed to ink compositions, and more specifically, the present invention relates to inks especially useful for acoustic ink printing, processes and apparatuses thereof, reference for example, the above recited copending patent applications, and U.S. Pat. No. 5,121,141, U.S. Pat. No. 5,111,220, U.S. Pat. No. 5,128,726, U.S. Pat. No. 5,371,53, U.S. Pat. No. 5,528,384 and U.S. Ser. No. 176,381, now abandoned the disclosures of which are totally incorporated herein by reference, including especially acoustic ink processes as illustrated in some of the aforementioned copending applications and patents, such as an acoustic ink printer for printing images on a record medium. Also, the inks of the present invention may be useful as ink jet inks, and for thermal ink jet processes.

More specifically, the present invention is directed to hot melt acoustic ink compositions wherein there can be generated with such inks excellent developed images with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention, there are provided inks that enable the elimination, or minimization of undesirable paper curl since water is not usually present, however, very small amounts of water can be selected in embodiments. With the inks of the present invention, it is preferred that there be an absence of water, and since water is not present in the inks a dryer can be avoided thereby minimizing the cost of the acoustic ink jet apparatus and processes thereof. Moreover, the absence of water permits the use of the inks in high volume printers and wherein the concerns about humidity, especially humidity increases, and the removal of water are avoided. The inks of the present invention in embodiments thereof are comprised of a colored vehicle and optionally a noncolored vehicle, reference U.S. Pat. Nos. 5,688,312; 5,667,568; 5,700,316 and 5,747,554, the disclosures of each application being incorporated herein by reference; and more specifically, wherein the invention ink resin is comprised of a reversibly crosslinked polymer based on the reversible cycloaddition reaction between a furan and a maleimide, which products have a low degree of coupling at higher temperatures, for example from about 100 to about 180° C., and a high degree of coupling at lower temperature, for example from about 10 to about 40° C. Coupling refers, for example, to the reaction of pendant or terminal groups on one chain with groups on another second chain to effect an increase in molecular weight. Reversibility indicates, for example, that the amount of coupling achievable after an extended time period, that is for example, the equilibrium amount of coupling, or an extended time period of from a few hours to several months, and preferably from about 3 hours to about 24 hours, and the coupling is primarily affected by the temperature, thus the degree of coupling can be increased or decreased by decreasing or increasing the temperature, respectively, through several temperature cycles, with substantially the same results on each cycle, which is of importance since, for example, a number of ink components can experience, in the AIP print head, several heating and cooling cycles corresponding to the off and on behavior of the printer, and it is desirable that such a history not have a significant adverse effect on the performance of the ink.

PRIOR ART

In acoustic ink printing, the printhead generates about 2.2 picoliter droplets by an acoustic energy process. The ink under these conditions should display a melt viscosity of about 25 centipoise or less at the jetting temperature. Furthermore, once the ink is jetted onto the paper, the ink image should be of excellent crease property, nonsmearing, waterfast, of excellent transparency and excellent fix qualities. In selecting an ink for such applications, it is desirable that the vehicle display a low melt viscosity, such as from about 1 centipoise to about 20, and preferably about 10 centipoise in the acoustic head, while also displaying solid-like properties after being jetted onto paper. Since the acoustic head can tolerate a temperature up to, for example, about 180° C. (Centigrade), and preferably up to a temperature of from about 100° C. to about 160° C., the vehicle for the ink should display liquid-like properties, such as a preferred viscosity of 1 to about 10 centipoise at a temperature of from about 100 to about 180° C., and solidify or harden after jetting onto paper such that the ink displays a hardness value of, for example, from about less than 0.1 to 0.5 millimeter utilizing a penetrometer according to the ASTM penetration method D1321.

Ink jet printing processes that utilize inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink which is melted in the apparatus will not be subject to evaporation or spillage during periods of nonprinting. The vehicle is also selected to have a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jet inks, however, a hot melt ink contains no solvent. Thus, rather than being liquid at room temperature, a hot melt ink is typically a solid or semi-solid having a wax-like consistency. These inks usually thus need to be heated to approximately 100° C. before the ink melts and converts into a liquid. A plurality of ink jet nozzles are provided in a printhead for acoustic ink jet apparatuses. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Water based thermal ink jets are disadvantageous in that the thermal ink has a tendency to soak into a plain paper medium. This blurs the print or thins out the print locally thereby adversely affecting print quality. Problems have been encountered with thermal ink jets in attempting to remove moisture from the ink fast enough so that the ink does not soak into a plain paper medium. This is particularly the situation when printing with color. Therefore, usually when printing with thermal ink, one needed to use coated papers, which are more expensive than plain paper.

One advantage of a hot melt ink jet is its ability to print on plain paper since the hot melt ink quickly solidifies as it cools and, since it is waxy in nature, and does not normally soak into a paper medium. However, hot melt ink jets can be cumbersome in structure and in design, for example the associated integrated electronics of a hot melt ink jet head are considerably more complex and costly than those of a thermal ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermo-electric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, and the like.

U.S. Pat. No. 4,853,036 and U.S. Pat. No. 5,124,718 disclose, for example, an ink for ink jet recording which comprises a liquid composition essentially comprising a coloring matter, a volatile solvent having a vapor pressure of 1 millimeter Hg or more at 25° C., and a solid material at room temperature.

"A Hot Melt Ink for Thermal Jet Printing", A. H. Sporer et al., *Journal of Imaging Science and Technology,* Vol. 36, No. 2, page 176 (March/April 1992), the disclosure of which is totally incorporated herein by reference, discloses an ink wherein the fluid vehicle of the ink is a stable, single-phase, water-in-oil (wax) microemulsion at elevated temperatures in the range of 70° C. to 95° C., yet is a solid at ambient temperatures. The ink, since it is a microemulsion, is stable to freeze-melt cycles. The ink is suitable for jetting as a hot melt ink in conventional continuous or impulse ink jet apparatus, and can also operate in impulse thermal ink jet printheads where other hot melt ink jet ink compositions cannot.

Certain reaction product adducts are illustrated in U.S. Pat. No. 3,435,003, the disclosure of which is totally incorporated herein by reference.

There are a number of limitations with respect to the use of waxy materials in solid ink printing inks. For example, waxy materials are typically of relatively low molecular weight (200 to 1,000 number average molecular weight) and therefore have low mechanical strength, resulting in them being easily scraped off the paper, being brittle and flaking off the crease when folded, being soft and easily removed, for example, by scraping with a fingernail. An ideal material might have archival properties similar to xerographic dry toner, that is good adhesion to paper, tough, hard, and very little crease characteristics. The properties of toner-like materials accrue from having a higher molecular weight than waxes, for example $M_n$ in the 5,000 to 50,000 range and $M_w$ in the 10,000 to 200,000 range. Unfortunately, materials, such as vehicles, of such high molecular weight are very viscous, and cannot be readily jetted from ink jet printing heads. What is needed to simultaneously meet the requirement for low molecular weight and hence low viscosity at the head temperature, about 100 to about 180° C., but high molecular weight and hence tougher on paper at ambient conditions, about 10 to about 40° C., is to have a molecular system which increases its molecular weight upon cooling, and decreases its molecular weight upon heating. This can be accomplished with the present invention in embodiments thereof wherein vehicles with reversible crosslinking are selected.

While known compositions and processes are suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions, which generate high quality, fast-drying images on a wide variety of plain papers at low cost, with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate is heated prior to printing and is cooled to ambient temperature, about 25° C. for example, subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided. The phase change inks of the present invention achieve these and other needs in embodiments thereof, and which phase change inks refer to inks which, for example, are solid at about room temperature, about 25° C., and liquid at jetting temperatures about 100 to about 180° C.

SUMMARY OF THE INVENTION

Examples of objects of the present invention include for example:

It is an object of the present invention to provide ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers.

It is still another object of the present invention to provide reversibly crosslinked phase change hot melt ink compositions which generate high quality images on plain papers.

Yet another object of the present invention is to provide hot ink jet ink compositions which exhibit low viscosity of from about 1 to about 20, and preferably from about 5 to about 10 centipoise at a temperature of from about 100° C. to about 180° C.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot melt ink jet ink compositions that contain no water, and which are suitable for use in acoustic ink jet printing processes.

It is still another object of the present invention to provide hot ink compositions that contain no water and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 centipoise (cP) at, for example, the jetting temperature which can be from about 100° C. to about 180° C., and preferably from about 100° C. to about 160° C. thereby enabling excellent jetting at reasonable power levels, and wherein a vehicle high molecular weight at low temperature and a low molecular weight at high temperature is achievable.

The present invention relates to an ink composition comprised of colorant and a phase change vehicle derived, obtained, or generated from the reaction product of an oligomeric resin or resins containing at least one furan moiety and at least one maleimide moiety, wherein at least one is, for example, from 1 to about 10, preferably from 1 to about 5, and in embodiments preferably 1, and which ink possesses a viscosity of from about 1 centipoise to about 20 centipoise at a temperature of from about 100° C. to about 180° C.; an ink composition comprised of colorant, and a phase change ink resin comprised of the reaction product of a furan polymer of the formula furan-R-furan and a maleimide of the formula maleimide-R-maleimide, wherein R is an aliphatic group with, for example, from 1 to about 50 carbon atoms, and preferably from 1 to about 12 carbon atoms, such as an alkyl, like methyl, ethyl, propyl, butyl, pentyl, hexyl, octyl, the isomers thereof, and the like, and which ink possesses a viscosity of from about 1 centipoise to about 20 centipoise at a temperature of from about 100° C. to about 180° C.

DETAILED DESCRIPTION OF THE INVENTION

In embodiments, the ink compositions of the present invention include a resin formed by cycloaddition reactions, such as the Diels-Alder cycloaddition of a furan and a maleimide. More specifically, in embodiments the present invention relates to inks with vehicles generated by a reversible crosslinking reaction whereby the ink vehicle at high temperature has a low viscosity primarily since it is not substantially crosslinked, and the material, or vehicle at low or room temperature, for example about 20 to about 40° C., is crosslinked and tough, thereby improving its adhesion to paper. The crosslinking toughness of the final developed print developed with the inks of the present invention enables the print to be, for example, scratch and crease resistant.

High temperature refers to the AIP (acoustic ink jet) printing head temperature of, for example, from about 100 to about 180° C., and preferably from about 100 to about 150° C. Low viscosity at a high temperature refers, for example, to an ink viscosity of from about 1 to about 20 centipoise, and preferably from about 2 to about 5 centipoise. Low, or room temperature refers to a temperature of from about 10 to about 40° C., and preferably from about 15 to about 30° C.

The ink vehicle can be generated by a reversible crosslinking reaction between pendant furan and maleimide groups. The basic chemistry is a reversible equilibrium referred to as Diels Alder cycloaddition whereby furan, symbolized by F, and maleimide, symbolized by M, react to form an adduct, symbolized by A, as summarized in the following scheme.

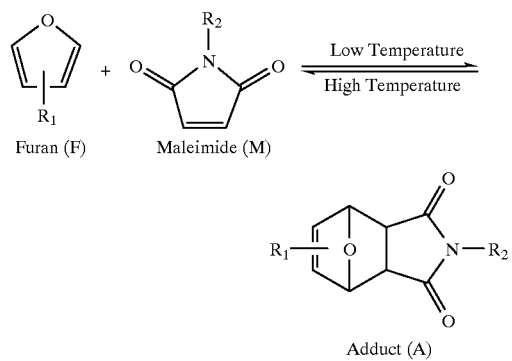

$$\text{Equilibrium.Constant.} K = \frac{[\text{Adduct}]}{[\text{Furan}][\text{Maleimide}]}$$

wherein the low temperature is from about 10° C. to about 50° C., and the high temperature is from about 80° C. to about 200° C.

The adduct A can be comprised of several isomers, for example exo, endo and diasteromers, any of which function as a crosslinker. When $R_1$ and $R_2$ are oligomers with an average of from about 1 to 10, and preferably from about 2 to 5 furan or maleimide groups, this chemistry can cause reversible cross linking of the polymer, or oligomer.

This reaction has the desirable property that the equilibrium position, as reflected by the equilibrium constant K, is very strongly temperature dependent primarily because the equilibrium entropy change, $\Delta S°$, is unusually strongly negative, generally from about −30 to about −50 cal/mole/K. At low temperature, for example at room temperature, for example from about 20 to about 40° C., the equilibrium shifts to the right in favor of Adduct A, whereas at elevated temperature, for example 100 to 180° C., the equilibrium shifts to the left, in favor of separated Furan, F, and Maleimide, M, species.

For the acoustic ink applications, $R_1$ and $R_2$ are preferably selected from short polymers of molecular weight less than about 3,000 and preferably less than about 1,000, and more specifically, from about 100 to about 1,000, thus the viscosity of the mixture at the high acoustic ink head temperature of from about 100 to about 180° C. remains low, for example from about 1 to about 20 centipoise. Examples of $R_1$ and $R_2$ are aryl, linear and branched hydrocarbons, poly(ethylene oxide), poly(propylene oxide), condensation polymers, and the like. Examples of the linear aliphatics include those with from about 1 to about 40 carbons, as in $(CH_2)_n$ where n is from 1 to about 40, such as methylene, ethylene, propylene, butylene and the like. Examples of branched aliphatics are isopropyl, isobutyl, sec-butyl, 2-methylpentyl, neopentyl ($-CH_2C(CH_3)_2CH_2-$), 2-ethylhexyl, 2-ethyloctyl, and the like. Examples of aryl include those groups or substituents with from 6 to about 30 carbon atoms, such as phenyl, tolyl, xylyl, biphenyl, naphthyl, and the like, ring substituted aryl groups with methyl, methoxy, carboxyl, chloro, bromo, and the like.

The resulting oligomeric furan(s) and/or maleimide(s) contain an average of from about 1 to about 10, and preferably from about 2 to about 5 furan and/or maleimide units, or segments on each chain. The ink may be comprised of the reaction product of an oligomer containing at least one furan moiety with an oligomer containing at least one maleimide, or the self reaction of an oligomer containing both a furan and maleimide containing moiety. Preferably, the ink is comprised of the reaction product of an oligomer containing two furan moieties with an oligomer containing two maleimide moieties. The $M_w$ of the oligomeric furan(s) and/or maleimide(s) are from about 1,200 to about 50,000 grams per mole, and the $M_n$ is from about 800 to about 30,000 with a polydispersity of from about 1.5 to about 6 as measured by Gel Permeation Chromatography.

Examples of an oligomeric furan include those of the formula $$F-Y_1-X-Y_2-F \text{ or } Z-(Y-F)_p$$

wherein F— is a furan containing ring, such as furfuryl, 2-furoyl, 3-furoyl, or singly or multiply substituted furans, but preferably furfuryl and 2-furoyl;

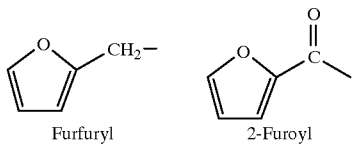

Furfuryl   2-Furoyl $-Y_1-$, or $-Y_2-$, which can be the same or different, can be any suitable chemically attaching group, including, but not limited to oxygen (—O—), amino (—NH— or —NR— wherein R is preferably alkyl), ester (—OC(O)—), amide (—NHC(O)— or —NRC(O)—, wherein R is preferably alkyl), and the like. —X— can be eliminated, or —X— can be any suitable low molecular weight chain, for example branched or linear aliphatics (—$C_nH_{2n}$—; where n=1 to about 200 and preferably 1 to about 50, poly(ethylene oxide) (—$(CH_2CH_2O)_m$—; where m=1 to about 100 and preferably 1 to about 25, poly(propylene oxide) (—$(CH_2CH(CH_3)O)_m$—; where m=1 to about 100 and preferably 1 to about 25, aromatic groups with, for example, from 6 to about 30 carbon atoms, such as 1,2-, 1,3-, and 1,4-disubstituted benzenes, naphthalenes, and the like; Z can be any suitable trifunctional, tetrafunctional or multifunctional low molecular weight species such as the tri-, tetra-, penta-, and hexa-substituted benzene rings, other multiply substituted aromatic rings, aliphatic multifunctional materials such as $CH_3CH_2C(CH_2-)_3$ and the like, for example, p=3, 4, or higher such as 6.

Examples of an oligomeric maleimides include those as represented by

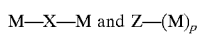

where M is maleimide and X, Z, and p are as indicated herein.

Examples of dyes and pigments selected include those with a black color, a cyan color, a magenta color, a yellow color, a red color, a brown color, and the like, and color gamuts. The dye may be black, cyan, magenta, yellow, red, blue, green, brown, mixtures thereof, and the like, present in the ink in an effective amount of, for example, from about 1 to about 65, and preferably from about 2 to about 20 percent by weight of the ink, and most preferably in an amount of from about 1 to about 10 weight percent. Preferred dyes are cyan and magenta dyes available from Miliken, such as cyan X17AB, and magenta REACTINT RED, X52.

Examples of suitable black dyes include various carbon blacks, such as REGAL 330®, channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, and mixtures thereof. Illustrative examples of magenta pigments include 2,9-dimethyl substituted quinacridone and anthraquinone, identified in the Color Index as Cl 60710, Cl Dispersed Red 15, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthrathrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other dyes may also be selected.

Pigments, can also be selected for the inks of the present invention, such as carbon blacks, like REGAL 330® available from Cabot Corporation, cyan, magenta, yellow, red, blue, green and the like pigments, which pigments are known, reference for example U.S. Pat. No. 5,556,727, the disclosure of which is totally incorporated herein by reference. The pigment amount selected is similar to the dye amount indicated herein.

The ink may also contain other known ink additives present in effective amounts, such as from about 0.01 to about 5 weight percent like fillers, biocides and the like. Optional additives for further improving the jetting characteristics and the storage stability of the inks, and for preventing undesirable interactions of the inks with the printhead either during the jetting process or while the printer is idle for the inks of the present invention as illustrated herein, include humectants, such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure, which it exerts against the surface of the pool, may reach a sufficiently high level to release individual droplets of liquid from the pool, despite the restraining force of surface tension. Focusing the beam on or near the surface of the pool intensifies the radiation pressure it exerts for a given amount of input power. K. A. Krause, "Focusing Ink Jet Head," *IBM Technical Disclosure Bulletin,* Vol. 16, No. 4, September 1973, pages 1168 to 1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed.

This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided so acoustic printing can be performed with a greater variety of inks than conventional ink jet printing, including inks having lower viscosities and inks containing pigments and other particulate components. Acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Embodiments of the present invention include an ink composition comprised of a colorant and a phase change vehicle derived from the reaction product of a resin containing at least one furan moiety and at least one maleimide moiety, and wherein the ink possesses a viscosity of from about 1 centipoise to about 20 centipoise at a temperature of from about 100° C. to about 180° C.; an ink wherein the resin is an oligomer; at least one is from 1 to about 10; an ink wherein at least one is from about 1 to about 3, and wherein the oligomer is of a number average molecular weight of from about 150 to about 3,000; an ink wherein the phase change vehicle is derived from the polymerization of an oligomeric resin containing both a furan moiety and a maleimide moiety of the formula furan-R-maleimide, wherein R is aliphatic, or aryl; an ink composition comprised of colorant and phase change vehicle, and wherein the phase change vehicle is obtained from the reaction of an oligomeric resin containing at least two furan moieties of the formula furan-R-furan, with an oligomeric resin containing at least two maleimides of the formula maleimide-R-maleimide, wherein R is an aliphatic group; an ink wherein at least two are from 2 to about 10; an ink wherein at least two are from 2 to 3; an ink wherein aliphatic contains from 1 to about 50 carbon atoms; an ink wherein aliphatic is alkylene; an ink wherein the reaction product adduct is generated by the following reaction wherein $R_1$ and $R_2$ are alkyl

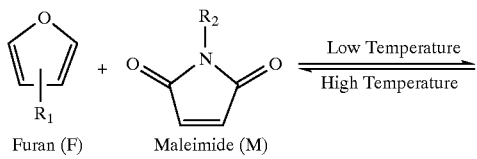

Furan (F)    Maleimide (M)

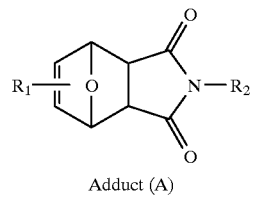

Adduct (A)

wherein the low temperature is from about 10° C. to about 50° C., and the high temperature is from about 80° C. to about 200° C.; an ink wherein the furan is of the formula F—$Y_1$—X—$Y_2$—F or Z—(Y—F)$_p$ wherein F— is a furan containing ring, —$Y_1$— and —$Y_2$—, are independently the chemically attaching group oxygen (—O—), amino (—NH— or —NR—), ester (—OC(O)—), amide (—NHC(O)— or —NRC(O)—); X is an aliphatic group; Z is a trifunctional, tetrafunctional or multifunctional moiety; and p represents the number of segments; an ink wherein the furan is of the formula F—$Y_1$—X—$Y_2$—F or Z—(Y—F)$_p$ wherein F— is a furan containing ring, —$Y_1$—, and —$Y_2$—, are independently the chemically attaching group oxygen (—O—), amino (—NH— or —NR—), ester (—OC(O)—), amide (—NHC(O)— or —NRC(O)—); X is an aliphatic group; Z is a trifunctional moiety; and p represents the number of segments; an ink wherein Y is oxygen, amino, alkylamine, ester, amide or alkyl amide; an ink wherein X is methylene, ethylene, propylene, butylene, pentylene, hexylene, heptylene, octylene, decylene or dodecylene; an ink wherein p is a number of from 1 to about 100; an ink wherein the oligomeric furan or oligomeric maleimide each possess an $M_w$ of from about 1,200 to about 50,000, an $M_n$ of from about 800 to about 6,000, and a polydispersity $M_w/M_n$ ratio of from about 1.5 to about 6; an ink composition wherein the ink is a solid at a temperature of from about 20° C. to about 40° C.; an ink composition wherein the colorant is a pigment or dye present in the ink in an amount of from about 0.01 to about 10 percent by weight; an ink wherein the reaction product vehicle is present in an effective amount of from about 85 to about 98 percent by weight of the ink composition, and wherein the colorant is a dye present in an amount of from about 2 to about 15 weight percent; an ink composition wherein the colorant is a dye present in an amount of from about 1 to about 10 weight percent; and wherein the colorant is cyan, magenta, yellow, blue, green, brown, black, or mixtures thereof; a printing process which comprises (a) incorporating into an acoustic ink jet printer an ink composition comprised of a colorant and the reaction product indicated herein, and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of the ink with focused acoustic radiation to eject individual droplets of ink therefrom on demand, the radiation being directed to focus with a finite waist diameter in a focal plane, the ink comprising the components indicated herein; and (b) causing droplets of the ink to be ejected onto a recording sheet in an imagewise pattern at a temperature of from about 120° C. to about 165°

C.; an ink composition in accordance with claim 12 wherein the viscosity thereof is from about 1 centipoise to about 6 centipoise at a temperature of from about 120° C. to about 160° C., and wherein R is methylene, ethylene, propyl, butyl, pentyl, hexyl, heptyl, octyl, nonyl, decyl, undecyl, dodecyl, tridecyl, hexadecyl, octadecyl, stearyl, lauryl, 2-methylpentyl, ethyleneoxyethyleneoxy-methane, ethyleneoxyethylene-oxyethylene-methane, or ethyleneoxyethyleneoxy-ethyleneoxyethylene-methane; X is ethylene, propylene, butylene, pentylene, hexylene, heptylene, octylene, nonylene, decylene, undecylene, dodecylene, tridecylene, hexadecylene, octadecylene, stearylene, laurylene, 2-methylpentylene, ethyleneoxyethyleneoxyethylene, ethyleneoxyethyleneoxyethylene, ethyleneoxyethyleneoxy-ethyleneoxyethylene, ethyleneoxyethyleneoxy-ethyleneoxy-ethyleneoxyethylene, propylene-oxypropylene-oxypropylene, propyleneoxypropylene-oxypropyleneoxy-propylene, propyleneoxypropylene-oxypropyleneoxypropylene-oxy-propylene, or poly(oxypropylene); an ink composition wherein the ink possesses a viscosity of from about 1 centipoise to about 20 centipoise at a temperature of from about 100° C. to about 180° C., and wherein the colorant is a dye, or a pigment present in an amount of from about 1 to about 10 weight percent; an ink wherein aliphatic contains from 1 to about 22 carbon atoms; an ink wherein R is the arylene, benzylene, anthrylene, or phenylene; and an ink wherein Z is trifunctional, and is a triamino, or a triester.

Specific embodiments of the invention will now be described in detail. These Examples are intended to be illustrative, and the invention is not limited to the materials, conditions, or process parameters set forth in these embodiments. All parts and percentages are by weight unless otherwise indicated. In these Examples, the colorant is bound to the vehicle.

EXAMPLE I

Synthesis of 1,6-Hexane-di-2-Furoamide

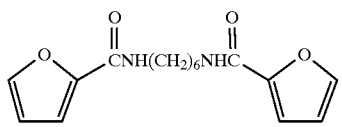

An apparatus comprised of a 3-necked 500 milliliter round bottom flask fitted with nitrogen inlet and outlet, stirrer and dropping funnel was charged with 2-methyl furoate (30 grams) and 20 milliliters of dioxane. The resulting mixture was cooled on an ice bath for 30 minutes. 1,6-Hexanediamine (13.5 grams) in 50/50 water/dioxane (40 milliliters) was then added dropwise over 30 minutes. The resulting mixture was stirred an additional 3 hours at room temperature, about 25° C. Water and dioxane were removed on a rotary evaporator and about 10 grams of the product chromatographed on silica gel, eluted with 4:1 ethyl acetate-:tetrahydrofuran to yield the above light yellow crystalline solid product. (m.p. 153° C.).

EXAMPLE II

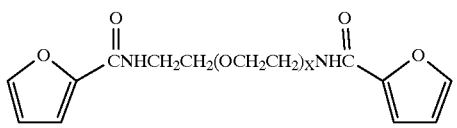

This compound is synthesized (wherein x is the number 3), for example, by reacting 2-furoic acid with JEFFAMINE EDR-192™ (a diamino poly(ethylene oxide wherein x=3) with a molecular weight of approximately 192, from Texaco Inc.) under condensation conditions with water removal. Thus, for example, a 3-necked 500 milliliter round bottom flask fitted with nitrogen inlet, Dean Stark water removal trap and stirrer is charged with 2-furoic acid (25 grams), xylene (125 milliliters), and JEFFAMINE EDR-192™ (19.2 grams). The contents are heated to reflux for 1 to 3 hours, during which time from about 3 to 3.6 grams of water collect in the Dean Stark trap. Cooling to room temperature and removal of the xylene on a rotary evaporator can provide, it is believed, the product in a yield of from about 70 to 100 percent. The above compound thus obtained is believed to have a melting point of from about 50 to about 120° C., and more specifically, it is believed the melting point was about 80° C.

EXAMPLE III

Synthesis of 4,4'-2-Furoamidobiphenyl

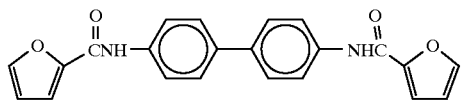

This compound is synthesized, for example, by reacting 2-furoic acid with 4,4'-diaminobiphenyl under condensation conditions with water removal. Thus, for example, a 3-necked 500 milliliter round bottom flask fitted with nitrogen inlet, Dean Stark water removal trap and stirrer is charged with 2-furoic acid (25 grams), xylene (125 milliliters), and diaminobiphenyl (18.4 grams). The contents can be heated to reflux for 1 to 3 hours, during which time from about 3 to 3.6 grams of water collect in the Dean Stark trap. Cooling to room temperature and removal of the xylene on a rotary evaporator can provide the above product in a yield of from about 70 to 100 percent. The product compound thus obtained will have, it is believed, a melting point of from about 50 to about 200° C., preferably 50 to 120° C., and more specifically, about 85, it is believed.

EXAMPLE IV

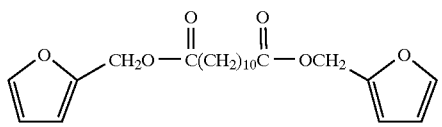

A 250 milliliter 3-necked flask was fitted with an Argon inlet and a 125 milliliter dropping funnel, and supported in an ice bath with magnetic stirring. The furfuryl alcohol (3.75 grams) and triethylamine (3.84 grams) were individually weighed out into a 20 milliliter vial then washed into the reactor with about 40 milliliters of methylene chloride. Dodecanedioyl dichloride (5.01 grams) was similarly weighed into a vial and transferred to the addition funnel. The dodecanedioyl dichloride was added to the reactor dropwise over 28 minutes, and there was formed a white precipitate (triethylamine hydrochloride) after about 7 minutes. The mixture was stirred on the ice bath for 2 hours. The bath was removed and stirring continued at room temperature for another 3 hours. Methylene chloride (40 milliliters) and water (80 milliliters) were added and the organic layer extracted into methylene chloride and washed with 0.1 N HCl, and then washed with water. After drying over magnesium sulfate, the methylene chloride was evaporated on a rotary evaporator to yield an oily white solid which solidified into a tan chunky product (6.28 grams; 86 percent yield). Recrystallization from hexane yielded a product of fine white needles of an m.p. of 37 to 38.5° C.

EXAMPLE V

Synthesis of 3,6,9-Trioxadecane Difurfurylamide from Furfuryl Amine and Trioxadecanoic Acid Furfuryl amine (19.9 grams) and 3,6,9-trioxadecanedioic acid (obtained from Hoechst Celanese Company, 22.6 grams) were added to xylene (130 milliliters) in a 500 milliliter flask fitted with condenser, Dean Stark water removal trap, overhead stirrer and oil bath heated to about 180° C. The mixture was stirred under reflux for 2.3 hours, during which time 3.45 milliliters of water were collected in the Dean Stark trap (94 percent). The mixture was cooled to room temperature with stirring, and the solvent removed at reduced pressure on a rotary evaporator to yield 3,6,9-trioxadecane difurfurylamide as a slightly brownish viscous oil (38.7 grams; 87 percent yield). Infrared spectroscopy verified the absence of acid carboxyl groups from the starting material.

EXAMPLE VI

Synthesis of Poly(ethylene oxide)-530 Difurfurylamide

Following the procedure of Example V, furfurylamine (10.7 grams) and poly(ethylene oxide)-530 dioic acid (obtained from Hoechst Celanese, and referred to as "polyglycol diacid (n=10 to 12)", HOOC—CH$_2$(OCH$_2$CH$_2$)$_n$—OCH$_2$COOH; 32.9 grams) were refluxed in xylene for one hour to yield water (1.85 milliliters; 97 percent) and the above product (32.2 grams; 78 percent yield).

EXAMPLE VII

Synthesis of 1,12-Dodecane Dimaleimide

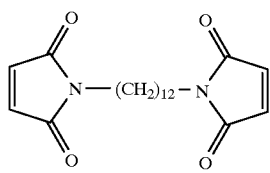

An apparatus comprising a 3-necked 500 milliliter round bottom flask equipped with nitrogen inlet and outlet, thermometer, dropping funnel and magnetic stirrer was charged with maleic anhydride (25.3 grams) in dimethyl formamide (75 milliliters). In a separate beaker, 1,12-dodecanediamine (26.05 grams) was dissolved in dimethyl formamide (100 milliliters), and when the solution was cooled to 50° C. it was added to the dropping funnel. The round bottom flask was cooled on an ice bath to maintain a temperature less than about 50° C. as the diamine solution was added dropwise, with stirring, over 60 minutes.

Sodium acetate (2.3 grams) was added, followed by acetic anhydride (28.6 grams) and the mixture heated at 50° C. for 3 hours. The mixture was cooled to room temperature, 23 to 25° C. throughout overnight, about 18 hours, and the solvent removed on a rotary evaporator to provide a dark viscous product.

This product was dissolved in about 100 milliliters of dichloromethane, but due to poor solubility it was washed carefully in a separatory funnel to ensure complete removal of the sodium acetate and acetic acid by washing with distilled water, followed by washing twice with an aqueous solution of 5 to 10 percent sodium carbonate. The mixture was finally washed with distilled water two times. The resulting organic mixture was evaporated to remove the dichloromethane and then freeze dried to ensure removal of any remaining water.

EXAMPLE VIII

Synthesis of Dimaleimido Poly(propylene oxide)-400

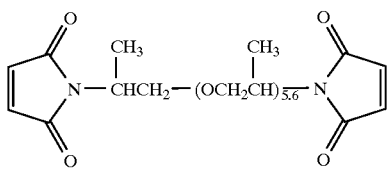

An apparatus comprising a 3-necked 500 milliliter round bottom flask equipped with nitrogen inlet and outlet, dropping funnel and magnetic stirrer was charged with maleic anhydride (29.4 grams) in dimethyl formamide (150 milliliters). Poly(propylene oxide)-400 diamine (JEFFAMINE D-400™ from Texaco; 60 grams) was dissolved in dimethyl formamide (100 milliliters) and placed in the dropping funnel. The flask was cooled on an ice bath and the PEO-400 solution added dropwise, with stirring, over 50 minutes.

Sodium acetate (2.625 gram) was added, followed by acetic anhydride (32.7 gram) and the mixture heated at 50° C. for 3 hours. The mixture was cooled to room temperature, (23 to 25° C. throughout) overnight, about 18 hours, and the solvent removed on a rotary evaporator to give the product as a dark viscous oil.

Column chromatography through a silica bed with ethyl acetate eluent provided the above product as a light brown viscous oil.

EXAMPLE IX

Synthesis of 1,3-Dodecane Dimaleimide

An apparatus comprising a 3-necked 500 milliliter round bottom flask equipped with nitrogen inlet and outlet, thermometer, dropping funnel and magnetic stirrer was charged with maleic anhydride (25.3 grams) in dimethyl formamide (75 milliliters). In a separate beaker, 1,3-diaminopentane (DYTEK EP™ diamine from DuPont, 13.2 grams) was dissolved in dimethyl formamide (100 milliliters) and added to the dropping funnel. The round bottom flask was cooled on a dry ice bath to maintain a temperature less than 50° C. as the diamine solution was added dropwise, with stirring, over 60 minutes.

Sodium acetate (2.3 grams) was added, followed by acetic anhydride (28.6 grams), and the mixture heated at 50° C. for 3 hours. The mixture was cooled to room temperature, 23 to 25° C. throughout overnight, about 18 hours, and the solvent removed on a rotary evaporator to provide a product of a dark viscous oil.

The above resulting oil was dissolved in about 100 milliliters of dichloromethane, and to ensure complete removal of the sodium acetate and acetic acid, was washed with distilled water followed by washing twice with an aqueous solution of 5 to 10 percent sodium carbonate. The mixture was finally washed with distilled water two times. The resulting organic solution was dried overnight, about 18 hours, using magnesium sulfate. After the solution was filtered to remove the magnesium sulfate, the solvent was removed on a rotary evaporator to give a yellow oil. A product of pale yellow crystals was obtained by recrystallizing from dichloromethane.

EXAMPLE X

Synthesis of Triethylene Glycol Dimaleimide

An apparatus comprising a 3-necked 500 milliliter round bottom flask equipped with nitrogen inlet and outlet, thermometer, dropping funnel and magnetic stirrer was charged with maleic anhydride (25.3 grams) in dimethyl formamide (75 milliliters). In a separate beaker, triethylene diamine (JEFFAMINE EDR 148™ from Texaco, 19.24 grams) was dissolved in dimethyl formamide (100 milliliters) and added to the dropping funnel. The round bottom flask was cooled on a dry ice bath to maintain a temperature less than 50° C. as the diamine solution was added dropwise, with stirring, over a period of 60 minutes.

Sodium acetate (2.3 grams) was added, followed by acetic anhydride (28.6 grams), and the mixture heated at 50° C. for 3 hours. The mixture was cooled to room temperature, 23 to 25° C. throughout overnight, about 18 hours, and the solvent removed on a rotary evaporator to provide a product of a dark viscous oil.

The oil resulting was then dissolved in about 100 milliliters of dichloromethane, and to provide for complete removal of the sodium acetate and acetic acid, was washed with distilled water followed by washing twice with an aqueous solution of 5 to 10 percent sodium carbonate. The mixture was finally washed with distilled water two times. The resulting organic solution was dried overnight using magnesium sulfate. After the solution was filtered to remove the magnesium sulfate, the solvent was removed on a rotary evaporator to give a yellow oil. A white solid product was obtained by recrystallizing from dichloromethane.

EXAMPLE XI

Synthesis of Branched Poly(propylene oxide) Trimaleimide

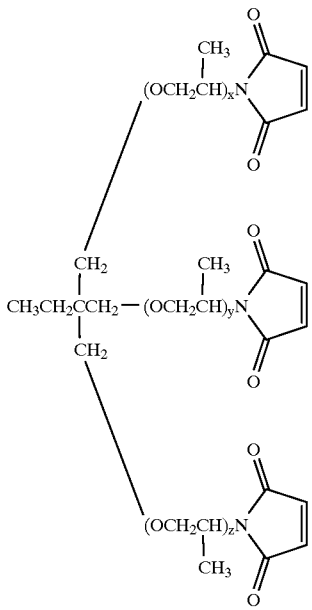

x + y + z = 5.3

This compound is synthesized, for example, by reacting maleic anhydride with JEFFAMINE T-403™ (from Texaco Chemicals Company; CAS 39423-51-3), according to the procedure described in Examples VII and VIII. Thus, for example, the reactor is charged with maleic anhydride (30 grams), DMF (30 grams), and JEFFAMINE T-403™ (40 grams).

EXAMPLE XII

Hot Melt Ink 1:

A blue hot melt acoustic printing ink is prepared by mixing the material, or product compound from Example I (30.4 grams) with that from Example VII (36 grams), and wherein a reaction results between the Example I and Example VII product, and Neopen Blue (BASF; 3.3 grams) at a temperature of from about 40° C. to about 150° C. and preferably 40° C. to 120° C. The ink obtained is believed to be substantially reversibly linked at room temperature, increasing its toughness and reversibly uncouples, by the Diels Alder cycloreversion reaction at temperatures above 100° C., and preferably 100 to 180° C.

EXAMPLE XIII

Hot Melt Ink 2:

A yellow hot melt acoustic printing ink is prepared, for example, by mixing the oligomer compound from Example III (37.2 grams) with that from Example VIII (56 grams) and Neopen Yellow (BASF; 4.0 grams) at a temperature of from about 10° C. to about 150° C., and preferably 40° C. to 120° C. The ink thus obtained is believed to be substantially reversibly linked at room temperature, increasing its toughness and reversibly uncouples, via the Diels Alder cycloreversion reaction at temperatures above 100° C., and preferably 100° C. to 180° C.

Reversible cycloaddition in the solid state at 20° C. to 60° C. can be demonstrated by infrared spectroscopy; there is a shift of the maleimido carbonyl group absorption from 1705 wavenumbers to 1695 wavenumbers in the adduct. The reaction is reversed by heating to 100° C. to 180° C.

EXAMPLE XIV

Hot Melt Ink 3:

A hot melt acoustic printing ink is prepared, for example, by mixing the product of Example IV (39 grams) with maleic anhydride (19.6 grams) at a temperature of from about 10° C. to about 150° C., and preferably 40° C. to 120° C. for about 1 to about 3 hours. Hexane diamine (11.6 grams) is added, and the mixture heated with mixing a further 10 minutes to 3 hours at a temperature of from about 20° C. to about 120° C., and then Neopen Blue (3.5 grams) is added. The ink thus obtained is believed to substantially reversibly link at room temperature, increasing its toughness and reversibly uncouples, via the Diels Alder cycloreversion reaction at temperatures above 100° C., and preferably 100° C. to 180° C. The primary advantage of this approach is that the addition of the diamine to the Diels Alder adduct of maleic anhydride avoids problems with potential Michael addition (attack of the amino groups on the maleimide double bond) instead of desired attack on maleimide carbonyl.

The inks of the above Examples can, it is believed, be selected for acoustic ink jet printing, and there will result images with excellent waterfastness, acceptable optical density, and wherein the paper with the images thereon is free from curling. Also, the inks of the above Examples possess desirable viscosities, for example, in the range of from about 2 to about 20 centipoise. The viscosity is measured as illustrated in the U.S. Pat. Nos. 5,688,312; 5,667,568 and 5,700,316, the disclosures of which are each totally incorporated herein by reference. Also, the present invention can include as the optional vehicle in amounts, for example, of from about 0 to about 95 weight percent the vehicles as illustrated in the aforementioned patents.

The inks of the present invention are selected for the development of images in an acoustic ink jet printer test fixture, and there resulted inks, it is believed, of excellent resolution, excellent waterfastness, acceptable optical densities, superior color, and wherein the paper substrate did not curl for an extended period of, for example, about one month.

Other modifications of the present invention may occur to those skilled in the art subsequent to a review of the present application, and these modifications, including equivalents thereof, are intended to be included within the scope of the present invention.

What is claimed is:

1. An ink composition comprised of a colorant and a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C. and wherein said resin is an oligomer and wherein at least one is from 1 to about 10, and wherein said ink contains additives of humectants, biocides, and fillers.

2. An ink in accordance with claim 1 wherein at least one is from about 1 to about 3, and wherein said oligomer is of a number average molecular weight of from about 150 to about 3,000.

3. An ink in accordance with claim 1 wherein the phase change vehicle is derived from the polymerization of an oligomeric resin containing both a furan moiety and a maleimide moiety of the formula furan-R-maleimide, wherein R is aliphatic, or aryl.

4. An ink in accordance with claim 1 wherein at least two are from 2 to about 10.

5. An ink in accordance with claim 1 wherein at least two are from 2 to 3.

6. An ink in accordance with claim 1 wherein said reaction product adduct is generated by the following reaction wherein $R_1$ and $R_2$ are alkyl

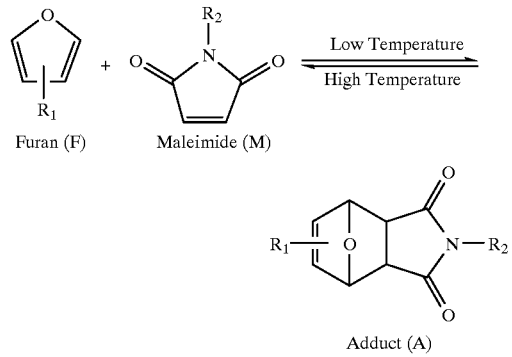

wherein the low temperature is from about 10° C. to about 50° C., and the high temperature is from about 80° C. to about 200° C.

7. An ink in accordance with claim 1 wherein said furan is of the formula $$F-Y_1-X-Y_2-F \text{ or } Z-(Y-F)_p$$

wherein F— is a furan containing ring, —$Y_1$—, and —$Y_2$—, are independently the chemically attaching group oxygen (—O—), amino (—NH— or —NR—), ester (—OC(O)—), amide (—NHC(O)— or —NRC(O)—); X is an aliphatic group; Z is a trifunctional, tetrafunctional or multifunctional moiety; and p represents the number of segments.

8. An ink in accordance with claim 7 wherein Y is oxygen, amino, alkylamine, ester, amide or alkyl amide.

9. An ink in accordance with claim 7 wherein X is methylene, ethylene, propylene, butylene, pentylene, hexylene, heptylene, octylene, decylene or dodecylene.

10. An ink in accordance with claim 7 wherein p is a number of from 1 to about 100.

11. An ink in accordance with claim 1 wherein the oligomeric furan or oligomeric maleimide each possess an $M_w$ of from about 1,200 to about 50,000, an $M_n$ of from about 800 to about 6,000, and a polydispersity $M_w/M_n$ ratio of from about 1.5 to about 6.

12. An ink composition in accordance with claim 1 wherein the ink is a solid at a temperature of from about 20° C. to about 40° C.

13. An ink composition in accordance with claim 1 wherein the colorant is a pigment or dye present in said ink in an amount of from about 0.01 to about 10 percent by weight.

14. An ink in accordance with claim 1 wherein said reaction product vehicle is present in an effective amount of from about 85 to about 98 percent by weight of the ink composition, and wherein said colorant is a dye present in an amount of from about 2 to about 15 weight percent.

15. An ink composition in accordance with claim 1 wherein said colorant is a dye present in an amount of from about 1 to about 10 weight percent; and wherein said colorant is cyan, magenta, yellow, blue, green, brown, black, or mixtures thereof.

16. An ink composition in accordance with claim 7 wherein the viscosity thereof is from about 1 centipoise to about 6 centipoise at a temperature of from about 120° C. to about 160° C., and wherein R is methylene, ethylene, propyl, butyl, pentyl, hexyl, heptyl, octyl, nonyl, decyl, undecyl, dodecyl, tridecyl, hexadecyl, octadecyl, stearyl, lauryl, 2-methylpentyl, ethyleneoxyethyleneoxy-methane, ethyleneoxyethylene-oxyethylene-methane, or ethyleneoxyethyleneoxyethyleneoxyethylene-methane; X is ethylene, propylene, butylene, pentylene, hexylene, heptylene, octylene, nonylene, decylene, undecylene, dodecylene, tridecylene, hexadecylene, octadecylene, stearylene, laurylene, 2-methylpentylene, ethyleneoxyethyleneoxyethylene, ethyleneoxyethyleneoxyethylene, ethyleneoxyethyleneoxy-ethyleneoxyethylene, ethyleneoxyethyleneoxy-ethyleneoxy-ethyleneoxyethylene, propylene-oxypropylene-oxypropylene, propyleneoxypropylene-oxypropyleneoxy-propylene, propyleneoxypropylene-oxypropyleneoxypropylene-oxypropylene, or poly(oxypropylene).

17. An ink composition in accordance with claim 1 wherein the ink possesses a viscosity of from about 1 centipoise to about 20 centipoise at a temperature of from about 100° C. to about 180° C., and wherein said colorant is a dye, or a pigment present in an amount of from about 1 to about 10 weight percent.

18. An ink in accordance with claim 1 wherein each of the additives are present in an amount from about 0.01 to about 5 weight percent.

19. An ink composition consisting essentially of a mixture of two separate components: (1) a colorant, and (2) a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C. in which ink further contains a humectant, a biocide and filler.

* * * * *